Sept. 6, 1932.  W. H. APPLEMAN  1,875,409
SHOCK ABSORBER FOR VEHICLES
Filed May 7, 1931
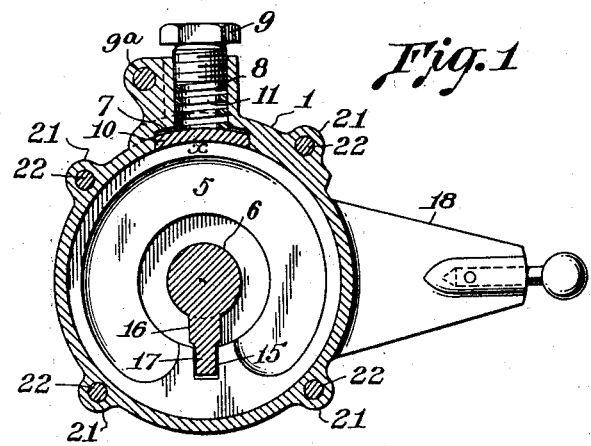
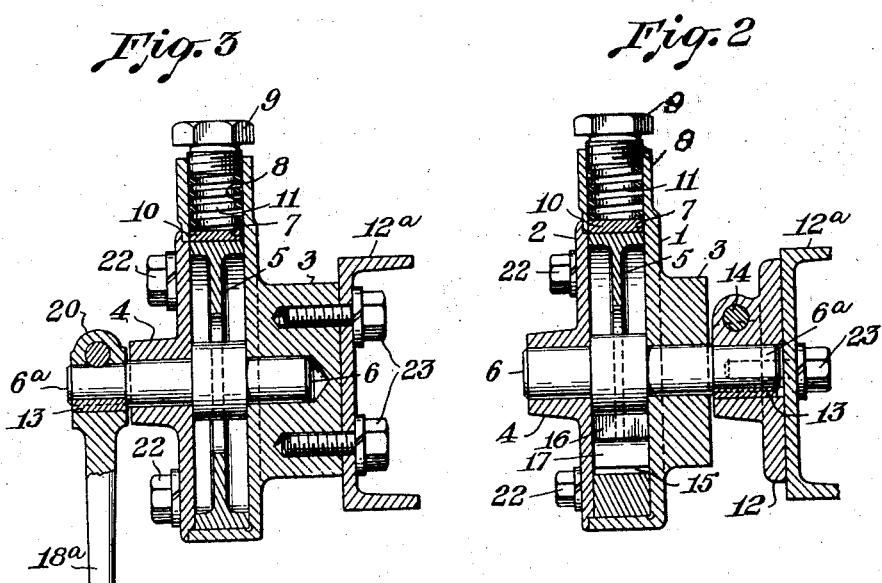
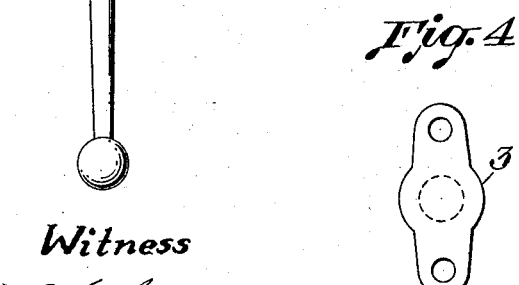
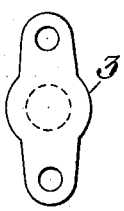
Witness
Inventor:
W. H. Appleman Patented Sept. 6, 1932

1,875,409

UNITED STATES PATENT OFFICE

WILLIAM H. APPLEMAN, OF BEAUMONT, TEXAS

SHOCK ABSORBER FOR VEHICLES

Application filed May 7, 1931. Serial No. 535,740.

My invention relates to means for controlling the abrupt rise and fall of the bodies of vehicles, when driving over rough and uneven roads.

The object of my invention is to provide a far more satisfactory device, than other devices now in use for the above stated purpose.

I attain my object by the mechanism illustrated in the accompanying drawing in which—

Figure 1 is a plan view of my device, bisected vertically near its center, and partly in section, in order to reveal the construction, arrangement and functions of interior parts.

Figure 2 is a front elevation of Figure 1 as it would appear with arm and ball pointing toward you and then bisected vertically at a right angle from that of Figure 1, and also is partly in section in order to further disclose the construction and arrangement of interior parts.

Figure 3 can hardly be called a real modification of Figure 1 and Figure 2, since it involves no different features of invention and simply affords a slightly different manner of attaching it to the vehicle.

Figure 4 is simply an outline plan view of that portion of Figure 2 and Figure 3, which aids in attaching the device to the vehicle, the latter of itself forming no portion of my invention. Like symbols indicate like or similar parts in the various figures.

Part 1 and 2 combined in all figures, provide a housing for retaining interior members in proper assembly. They are both machined throughout and as each are provided with a central enlargement or boss, 3 and 4 respectively, which when also suitably bored, provide an annular bearing for a machined disc 5, and also suitable bearings for shaft 6, as well as lateral support for both disc 5 and shaft 6. Parts 1 of housings, Figures 1, 2 and 3 are each provided with short horizontal, and also vertical machined chambers 7 and 8, the latter being capped with nut 9 which is locked by compression bolt 9a. Inserted in chamber 7 is a small brake shoe 10, which rests on the rim of disc 5, and which is acted upon by spring 11. Shaft 6 has an external extension 6a which is adapted to carry an arm, similar to arm 18a, Figure 3, or may be rigidly attached to the frame of the vehicle by means of a boss or bracket 12, Figure 2, key 13, and compression boss and bolt 14, said bracket 12 being then bolted to frame 12a, Figures 2 and 3 of the vehicle. Shaft 6, with its external extension 6a, is reversible and in the event that the vehicle manufacturer prefers to attach the housing direct to the vehicle as in Figure 3, it is only necessary to reverse shaft 6 and attach the actuating arm 18a as in Figure 3 without in any wise causing any change in other interior parts or of affecting the functions of the device.

Disc 5 has an internal bore lying well outside of shaft 6 proper, and is provided with one or more gains or channels 15, while shaft 6 is provided with an arm 16, having a blade like extension 17, which enters channel 15 with a clearance of about two one thousandths of an inch, which service has shown affords a limited but ample flexible connection between disc 5 and shaft 6.

When it is desired to manufacture my device for application to the vehicle as shown in Figure 1 and Figure 2, the actuating arm 18, which (with present metals) would likely be cast integral with housing 1, would be left on the housing in the mould. Shaft 6 would then be reversed and actuating arm 18a as shown in Figure 3 would be omitted.

Housing 1 is provided with a series of small external bosses 21, which are bored and threaded, and member 2 of the housing which acts in part as a covering plate, is provided with bosses 21 to match those on member 1 of the housing, and is secured thereto by a series of bolts 22.

I have not deemed it necessary to submit complete external assembly views, as they would reveal nothing that is not already clear to any one versed in the art.

It will be evident that members 1 and 2 of all figures furnish a complete casing or housing for all interior parts, and especially an annular bearing for disc 5, also journal bearings for shaft 6, as well as lateral support for both disc 5, and shaft 6. Disc 5 has no contact with shaft 6 except through arm 16, and its blade extension 17 which enters channel 15 with just clearance enough to produce a limited flexible connection, and which by endurance tests have been found to not require over two thousandths of an inch. Without any change of interior parts, or in any wise affecting their functions, my device may be attached to the frame of the vehicle, by two methods. The device may eventually fall into the hands of automobile manufacturers, but more likely shall rest in the hands of manufacturers of accessories, and in which event orders taken by them will contain the auto builders preference as to whether the device is to be bolted direct to the car frame as in Figure 3, or if it is to be attached through the shaft and bracket as in Figure 2. The auto builders decision, however, only determines whether actuating arm shall be left on the housing, or whether it shall be omitted there, and attached to the extension 6a of shaft 6, said shaft being reversible and adapted to fit either bracket 14, Figure 2, or arm 18a, Figure 3.

In assembly, brake shoe 10 is first inserted, next disc 5 is placed in position as shown in all figures, shaft 6 is next placed in position and covering plate 2 of the housing is bolted on to member 1 of the housing, spring 11 is then dropped into chamber 7 from the top, nut 9 is then screwed down on top of spring 11 until the proper resistance is felt, when applying weight or force to the end of the arm that has been adopted.

The principle around which the device is built is extremely novel, and evolves from the fact that journaling disc 5, at its periphery and by then forming a flexible connection between shaft 6 and disc 5, at an average distance of about fifty-five percent from its radial center to its radial diameter, it breaks up, or rather eliminates the torque effect that would exist if the disc was mounted on shaft 6 instead of peripherally journaled against the housing.

In the manner in which disc 5 is mounted, all force that is delivered at blade 17 of arm 16 against the disc, tends to force the disc sidewise in about the same manner as if its top was pivoted at the point marked X at the top of the disc. Furthermore, all force delivered through arm 16 to disc 5 reaches it so far inside of its frictional contact against its peripheral bearing, that its rotary tendency is so near overcome that a small brake shoe acted upon by a very light spring brings it under such perfect control, that any desired measure of resistance at the end of the actuating arm is easily obtained and maintained. Thorough tests have shown that a weight of 100 pounds suspended at the end of the actuating arm only exerts a rotary force of about 25 lbs. at the rim of the disc, as compared with about 225 pounds which would result if the disc was mounted on shaft 6, and then had no peripheral contact with the housing.

The device is not a snubber, but is a double acting shock absorber. It meets every desirable feature found in the leading hydraulic devices without any grease or liquid content other than that required for normal lubrication. It will be obvious to any one skilled in the art that the device will function identically the same regardless of whether it be the housing or the shaft that is being rotated or rather rocked, so long as one of these two members is held rigid thereby offering great convenience in attaching it to the vehicle. I have not deemed it necessary to show a means for connecting the actuating arm to the axle of the vehicle, as it forms no part of my invention. Many forms are in use, and now old, but a number of them are perfectly adapted to use with my device.

The actual normal neutral position of my device is shown in Figure 1, with the actuating arm lying horizontal and arm 16 on shaft 6 pointing downward and directly opposite from the brake shoe and spring.

What I claim is—

1. In a vehicle shock absorbing device, the combination of a housing containing an annular and also a transverse chamber, a rotatable disc peripherally journalled against the walls of said annular chamber, a shaft entering and journaled upon bearings in said housing and having the same axis as said disc, an arm on said shaft which flexibly engages with said disc, a braking member applied against the surface of said disc for controlling rotatable resistance between said housing and said disc and gearless means for imparting rotatable changes between said housing and said disc.

2. A housing containing an annular and also a transverse chamber, a rotatable disc peripherally journaled upon the walls of said annular chamber, a braking device applied against the surface of said disc, a spring confined within said transverse chamber and forming a part of said braking device, an adjustable nut entering said transverse chamber for controlling the tension of said spring, and gearless means for changing the rotatable relations between said housing and said disc.

3. A housing containing an annular and a transverse chamber, a gearless disc peripherally journaled upon the wall of said annular chamber, a shaft entering and journaled upon bearings in said housing, and having the same axis as said disc, an arm on said shaft that flexibly engages with said disc and which while not supporting said disc, maintains at all times, the same rotatable relation to said disc, regardless of the rotatable relation of the arm and disk, with respect to the housing, and gearless means for imparting rotatable changes between said disc and said housing.

4. A housing containing an annular bearing, a gearless disc peripherally journaled upon the walls of said annular bearing, a shaft entering and journaled upon bearings in said housing, a flexible connection formed between said shaft and said disc that precludes a sliding movement between said shaft and said disc at their points of contact.

5. A housing containing an annular bearing, a gearless disc peripherally journaled against the walls of said annular bearing, a shaft entering and journaled upon bearings in said housing, a flexible connection formed between said shaft and said disc which at their point of contact constantly remain at the same distance from the axis of said shaft.

6. A housing containing an annular bearing, a gearless disc journaled upon the walls of said annular bearing, a shaft entering and journaled upon bearings in said housing, a flexible connection formed between said shaft and said disc which precludes any change in the distance between the axis of said disc and the central point of engagement between said disc and said shaft, and a braking member, applied against the surface of said disc.

7. A housing containing an annular bearing, a disc mounted upon the walls of said annular bearing, a shaft entering and journaled upon bearings in said housing, a flexible connection between said disc and said shaft, which precludes said shaft and said disc from rotating in opposite directions, and a braking member applied to the surface of said disc.

8. In a vehicle shock absorbing device the combination of a housing that provides an annular chamber, a transverse chamber, and a central bearing for a shaft, an oscillating disc peripherally journaled against the inner circular wall of said annular chamber, an oscillating shaft entering said annular chamber, and journaled in said central bearing, an arm on said shaft having a direct non-rigid engagement with said disc, by means of which both said shaft and said disc, when oscillated, retain fixed rotatable relations.

9. In a vehicle shock absorbing device the combination of a housing that provides an annular chamber, a transverse chamber and a central bearing for a shaft, an oscillating disc peripherally journaled against the inner wall of said annular chamber, an oscillating shaft entering said annular chamber, and journaled in said central bearing, an arm on said shaft which non-rigidly engages with said disc substantially midway between the axis of said disc and its peripheral contact with said annular bearing, by reason of which the rotative tendency of said disc is greatly minimized by the directness with which it may be forced edgewise against the wall of said annual chamber.

WILLIAM H. APPLEMAN.